(12) United States Patent
Deck (10) Patent No.: US 6,882,432 B2
(45) Date of Patent: Apr. 19, 2005

(54) FREQUENCY TRANSFORM PHASE SHIFTING INTERFEROMETRY

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 09/919,511

(22) Filed: Jul. 31, 2001

(65) Prior Publication Data

US 2002/0109851 A1 Aug. 15, 2002

Related U.S. Application Data

(60) Provisional application No. 60/223,803, filed on Aug. 8, 2000.

(51) Int. Cl.$^7$ ................................................ G01B 9/02
(52) U.S. Cl. ...................... 356/512; 356/513; 356/514; 356/515; 356/519
(58) Field of Search ................................ 356/512, 513, 356/514, 515, 519

(56) References Cited

U.S. PATENT DOCUMENTS

| | | | |
|---|---|---|---|
| 4,594,003 A | | 6/1986 | Sommargren |
| 6,006,128 A | * | 12/1999 | Izatt et al. .................. 600/476 |
| 6,028,670 A | | 2/2000 | Deck |
| 6,359,692 B1 | * | 3/2002 | Groot ......................... 356/512 |

OTHER PUBLICATIONS

Kinoshita M. et al., "Optical Frequency–Domain Imaging Microprofilometry with a Frequency–Tunable Liquid–Crystal Fabry–Perot Etalon Device", *Applied Optics, Optical Society of America*, vol. 38, No. 34, Dec. 1, 1999, pp. 7063–7068.

L. Deck; "Measurements using Fourier–Transform Phase Shifting Interferometry", Proc. ASPE 25, 115–118 (2001).

L. Deck; "Multiple Surface Phase Shifting Interferometry", Proc. SPIE, 4451, 424–430 (2001).

L. Deck and J.A. Soobitsky, "Phase–shifting via wavelength tuning in very large aperture interferometers," Proc. SPIE, 3782–58, 432–442, 1999.

L. Deck; "Simultaneous Multiple Surface Measurements using Fourier–Transform Phase Shifting Interferometry, in: 4th International workshop on automatic processing of fringe patterns", Fringe 2001, Elsevier, Paris, (2001), 230–236.

(Continued)

Primary Examiner—Constantine Hannaher
Assistant Examiner—Shun Lee
(74) Attorney, Agent, or Firm—Fish & Richardson P.C.

(57) ABSTRACT

The invention features methods and systems in which wavelength-tune PSI data is analyzed in the frequency domain to produce spectrally separated frequency peaks each corresponding to a particular pair of surfaces in an interferometric cavity defined by multiple pairs of surfaces. Each frequency peak provides optical path length information about a corresponding pair of surfaces in the cavity. As a result, the interferometric data from such cavities provides simultaneous information about multiple surfaces.

34 Claims, 5 Drawing Sheets

OTHER PUBLICATIONS

P. de Groot, "Chromatic dispersion effects in coherent absolute ranging," Opt. Lett., vol. 17, pp. 898–900, 1992.

Peter de Groot, "Derivation of algorithms for phase–shifting interferometry using the concept of a data–sampling window," Applied Optics, vol. 34, p. 4723, 1995.

Peter de Groot, "Measurement of transparent plates with wavelength–tuned phase–shifting interferometry," Applied Optics, vol. 39, No. 16, pp. 2658–2663, 2000.

Klaus Freischlad, "Fourier Analysis of Phase Shifting Algorithms," Proc. SPIE vol. 3407, pp. 73–85, 1998.

K. Freischlad, "Large flat panel profiler," Proc. SPIE 2862, pp. 163–171, 1996.

J.E.Greivenkamp and J.H.Bruning, "Phase shifting interferometry," Optical Shop Testing, D. Malacara, pp. 501–598, J.Wiley, New York, 1992.

Susumu Kuwamaura and Ichirou Yamaguchi, "Wavelength scanning profilometry for real–time surface shape measurement," Appl. Opt., 36, 4473–4482 (1997).

Okada et al., "Separate measurements of surface shapes and refractive index inhomogeniety of an optical element using tunable–source phase shifting interferometry," Applied Optics, vol. 29, No. 22, pp. 3280–3285, 1990.

M. Suematsu and M. Takeda, "Wavelength–shift interferometry for distance measurements using Fourier transform technique for fringe analysis," Applied Optics, vol. 30, No. 28, pp. 4046–4055, 1991.

* cited by examiner

| Order | OPD | fc/fmin |
|---|---|---|
| 1st | $2nT$ | $2q$ |
| | $2L_1$ | $2rq$ |
| | $2L_2$ | $2sq$ |
| | $2L_1+2nT$ | $(2+2r)q$ |
| | $2nT+2L_2$ | $(2+2s)q$ |
| | $2L_1+2nT+2L_2$ | $(2+2r+2s)q$ |
| 2nd | $4L_1$ | $4rq$ |
| | $4nT$ | $4q$ |
| | $4L_2$ | $4sq$ |
| | $4L_1+2nT$ | $(4r+2)q$ |
| | $4L_1+2nT+2L_2$ | $(4r+2+2s)q$ |
| | $4L_1+4nT$ | $(4r+4)q$ |
| | $4L_1+4nT+2L_2$ | $(4r+4+2s)q$ |
| | $2L_1+4nT$ | $(2r+4)q$ |
| | $2L_1+4nT+2L_2$ | $(2r+4+2s)q$ |
| | $2L_1+2nT+4L_2$ | $(2r+2+4s)q$ |
| | $2L_1+4nT+4L_2$ | $(2r+4+4s)q$ |
| | $4nT+2L_2$ | $(4+2s)q$ |
| | $2nT+4L_2$ | $(2+4s)q$ |
| | $4nT+4L_2$ | $(4+4s)q$ |
| | $2L_1+2nT$ | $|2r-2|q$ |
| | $2L_1+2L_2$ | $(2r+2s)q$ |
| | $2L_1-2nT-2L_2$ | $|2-2r-2s|q$ |
| | $2L_1-2L_2$ | $|2r-2s|q$ |
| | $2L_1+2nT-2L_2$ | $|2+2r-2s|q$ |
| | $2nT-2L_2$ | $|2-2s|q$ |
| | $4L_1+4nT-4L_2$ | $(4r+4+4s)q$ |

FREQUENCY TRANSFORM PHASE SHIFTING INTERFEROMETRY

CROSS-REFERENCE TO RELATED APPLICATIONS

This application claims priority from provisional application Ser. No. 60/223,803 by Leslie L. Deck filed Aug. 8, 2000 entitled "Fourier Transform Phase Shifting Interferometry," the contents of which is incorporated herein by reference.

BACKGROUND

The invention relates to wavelength-tuning, phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

Unfortunately, PSI measurements can be complicated by additional reflections from other surfaces of the measurement object that contribute to the optical interference.

SUMMARY

The invention features methods and systems in which optical frequency-tune PSI data is analyzed in the frequency domain to produce spectrally separated frequency peaks each corresponding to a particular pair of surfaces in an interferometric cavity defined by multiple pairs of surfaces. Each frequency peak provides optical path length information about a corresponding pair of surfaces in the cavity. As a result, the interferometric data from such cavities provides simultaneous information about multiple surfaces. For example, information about any particular surface may be determined generically, and, unlike conventional PSI methods, do not require the interference to occur at specific frequencies. Additionally, this information may be determined without the need for adjacent data points to be sampled to produce a phase interval fixed by the cavity length of interest. Furthermore, embodiments of the invention preserve three-dimensional relational characteristics between different profiled surfaces because the information is derived from a single measurement.

In addition to determining single and multiple surface profiles, embodiments of the invention are disclosed that use information about multiple surface pairs to determine optical thickness, physical thickness, and homogeneity (i.e., refractive index variations). Furthermore, embodiments are disclosed that optimally position a measurement part relative to one or more reference surfaces to spectrally separate frequency peaks associated with second-order reflections from the different cavity surfaces. Finally, embodiments are disclosed that implement an optical frequency monitor to calibrate the optical frequency tuning.

In general, in one aspect, the invention features an interferometry method for characterizing a test object. The method includes: (i) forming an optical interference image by combining different portions of an optical wave front reflected from multiple surfaces of the test object and at least one reference surface, the multiple surfaces of the test object and the at least one reference surface defining a set of cavity surfaces; (ii) recording an interference signal at different locations of the optical interference image in response to tuning the frequency of the optical wave front over a range of frequencies, wherein the interference signal includes a contribution from each pair of different surfaces in the set of cavity surfaces; and (iii) for each location, calculating a frequency transform of the interference signal at a frequency corresponding to each of selected pairs of the different surfaces in the set of cavity surfaces and extracting the phase of the frequency transform at each of the frequencies corresponding to the selected pairs of surfaces.

Embodiments of the interferometry method may include any of the following features.

The method may further include calculating the frequency corresponding to each of the selected pairs of surfaces based on a nominal value for an optical path length difference for each of the selected pairs of surfaces and the frequency tuning rate.

The method may further include transforming the interference signal into the frequency domain for at least one of the locations to produce a transformed signal having series of frequency peaks corresponding the pairs of different surfaces in the set of cavity surfaces, and selecting the frequencies corresponding to the selected pairs of surfaces from the series of frequency peaks.

Selecting the frequencies corresponding to the selected pairs of surfaces from the series of frequency peaks may be based on the relative positions of the cavity surfaces.

The frequency transform may include a Fourier transform, including a sliding window Fourier transform. The Fourier transform may be implemented as a Fast Fourier transform.

Calculating the frequency transform may include multiplying the interference signal with a window function and calculating the Fourier transform of the windowed interference signal at the frequency corresponding to the selected pair of surfaces. For example, the window function may be selected to reduce a contribution to the frequency transform at the frequency corresponding to one of the selected pairs of surfaces from at least one other pair of different surfaces in the set of cavity surfaces. Suitable window functions include, e.g., a Tukey window and a Hamming window.

The interferometry method may further include determining the surface profile of one of the test object surfaces based on at least some of the extracted phases, determining a relative optical thickness profile between two of the test object surfaces based on at least some of the extracted phases, or determining the surface profile of multiple ones of the test object surfaces based on at least some of the extracted phases. In the latter case, the method may further include determining a relative orientation between two of the profiled test object surfaces based on at least some of the extracted phases.

The at least one reference surface referred to in the method may be one reference surface. For example, the test object may have a partially transparent front surface and a back surface with the front surface positioned nearer to the reference surface than the back surface. Accordingly, the front, back, and reference surfaces define a three-surface cavity.

Alternatively, the at least one reference surface referred to in the method may include two reference surfaces and the test object may be positioned between the two reference surfaces. For example, the test object may have partially transparent front surface and back surfaces, and the front, back, and two reference surfaces define a four-surface cavity.

In the case of the four-surface cavity, the method may further include interferometrically measuring a phase profile of a reference cavity formed by the two reference surfaces when the test object is not positioned between the two reference surfaces. For example, the reference cavity may be formed by removing the test object from between the two reference surfaces after the four-surface cavity measurement. Alternatively, the reference cavity measurement may be made before the four-surface cavity measurement.

Furthermore, the test object may define an aperture smaller than an aperture defined by the two reference surfaces. This allows for compensating for the phase profile of the reference cavity for changes in the positions of the reference surfaces between the four-surface cavity measurement and the reference cavity measurement. Such compensation is based on the phase profile from each measurement corresponding to the two reference surfaces at the locations outside of the test object aperture.

Using the four-surface cavity and the reference cavity, a relative homogeneity profile of the test object may be determined based on the extracted phases, the relative phase profile of the reference cavity, and nominal values for the test object index and thickness. Furthermore, the absolute physical thickness profile of the test object may be determined based on a specified tuning range and a total change in the extracted phases over a period in which the frequency of the optical wave front is tuned over the specified tuning range. Similarly, the absolute homogeneity profile of the test object may be calculated, based on a total change in the extracted phases over a period in which the frequency of the optical wave front is tuned over a selected tuning range. For example, the specified tuning range may be determined using a wavelength monitor.

Generally, the test object is positioned relative to the reference surface(s) to cause the optical path length difference for each of the pairs of different surfaces of interest in the set of cavity surfaces to differ. Moreover, the test object may be positioned relative to the reference surface(s) to cause contributions to the interference signals from second order reflections in the set of cavity surfaces to occur at frequencies that differ from the frequencies corresponding to the selected pairs of surfaces. For example, the test object may be positioned relative to the at least one reference surface such that the optical path lengths of successive, adjacent pairs of the cavity surfaces are substantially proportional to one another by a unique power of 3.

In some embodiments, the frequency tuning may be monitored with a wavelength monitor, e.g., an interferometer measuring a well-defined cavity OPD. The frequency transform may be based on the monitored frequency tuning to compensate for nonlinear frequency tuning.

In general, in another aspect, the invention features a second interferometry method for characterizing a test object. The second method includes: (i) forming an optical interference image by combining different portions of an optical wave front reflected from multiple surfaces of the test object and at least one reference surface, the multiple surfaces of the test object and the at least one reference surface defining a set of cavity surfaces; (ii) recording an interference signal at different locations of the optical interference image in response to tuning the frequency of the optical wave front over a range of frequencies, wherein the interference signal includes a contribution from each pair of different surfaces in the set of cavity surfaces; (iii) transforming the interference signal into the frequency domain for at least one of the locations to produce a transformed signal having series of frequency peaks corresponding the pairs of different surfaces in the set of cavity surfaces; (iv) identifying a frequency corresponding to each of one or more selected pairs of surfaces from the series of frequency peaks; and (v) determining an absolute optical thickness for each of the selected pairs of surfaces based on the corresponding identified frequency and the frequency tuning rate.

Embodiments of the second interferometry method may further include any of the following features.

The transforming, identifying, and determining steps may be performed at multiple locations.

The frequency tuning rate may be monitored and determined using a wavelength monitor. Furthermore, the transformed signal may be produced based on the monitored frequency tuning.

Furthermore the one or more selected pairs of surfaces referred to in the second method may include multiple selected pairs of surfaces.

Embodiments of the second method may further include features of corresponding to those described above with reference to the first method.

In general, in a further aspect, the invention features an interferometry system for characterizing a test object. The system includes: (i) a frequency-tunable light source; (ii) an interferometer including at least one reference surface, wherein during operation the interferometer directs different portions of an optical wave front derived from the light source to multiple surfaces of the test object and the at least one reference surface and recombines the different portions to form an optical interference image, the multiple surfaces of the test object and the at least one reference surface defining a set of cavity surfaces; (iii) a multi-element photo-detector positioned to record an interference signal at different locations of the optical interference image in response to frequency tuning of the light source, wherein the interference signal includes a contribution from each pair of different surfaces in the set of cavity surfaces; and (iv) an electronic controller coupled to the light source and the photo-detector, wherein during operation the controller, for each location, calculates a frequency transform of the interference signal at a frequency corresponding to each of selected pairs of the different surfaces in the set of cavity surfaces and extracts the phase of the frequency transform at each of the frequencies corresponding to the selected pairs of surfaces.

In general, in yet another aspect, the invention features a second interferometry system for characterizing a test object. The system includes: (i) a frequency-tunable light source; (ii) an interferometer including at least one reference surface, wherein during operation the interferometer directs different portions of an optical wave front derived from the light source to multiple surfaces of the test object and the at least one reference surface and recombines the different portions to form an optical interference image, the multiple surfaces of the test object and the at least one reference surface defining a set of cavity surfaces; (iii) a multi-element photo-detector positioned to record an interference signal at different locations of the optical interference image in response to frequency tuning of the light source, wherein the interference signal includes a contribution from each pair of different surfaces in the set of cavity surfaces; and (iv) an electronic controller coupled to the light source and the photo-detector, wherein during operation the controller: (a) transforms the interference signal into the frequency domain for at least one of the locations to produce a transformed signal having series of frequency peaks corresponding the pairs of different surfaces in the set of cavity surfaces; (b) identifies a frequency corresponding to each of one or more selected pairs of surfaces from the series of frequency peaks; and (c) determines an absolute optical thickness for each of the selected pairs of surfaces based on the corresponding identified frequency and the frequency tuning rate.

Embodiments of either of the interferometry system may also be configured to perform any of the functions or operations in the above described interferometry methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The invention features methods and systems that perform phase-shifting interferometry (PSI) using optical frequency modulation in an unequal path interferometer (e.g., a Fizeau interferometer) to generate phase shifts. The optical frequency-tune PSI data is analyzed in the frequency domain to produce spectrally separated frequency peaks each corresponding to a different pair of surfaces in an interferometric cavity defined by multiple pairs of surfaces. Embodiments of the interferometry technique may hereinafter be referred to as Frequency Transform Phase Shifting Interferometry ("FTPSI").

In a two-surface cavity, a change in optical frequency induces a corresponding change in interference phase that is proportional to the optical path difference (OPD). Similarly, in a cavity having more than two surfaces, the multiple reflective surfaces will give rise to interference patterns that have different phase shifts for the same change in optical frequency. Each of the different phase shifts corresponds to the optical path difference between each surface pair (i.e., elemental two-surface cavity) within the cavity. As a result, interferometric data from such cavities may be transformed into the frequency domain (e.g., by a using a Fourier transform) to produce a set of spectrally separated frequency peaks. Each such peak corresponds to a particular pair of surfaces in the cavity and provides optical path length information about the pair of surfaces. Moreover, embodiments of the invention may be configured so that the interference phase-shift frequency for each surface pair in the interferometer are distinct from one another.

The peak frequency of each cavity can be determined from knowledge of the nominal optical thickness of the cavity and the nominal optical frequency tuning rate. Alternatively, the peak frequency of each cavity can be obtained from the frequency-transformed interferometric data. The interferometric phase of each cavity can be determined from the discrete Fourier transform of the interference, evaluated approximately at the peak frequency. The interferometric phase distribution (or phase map) across each cavity can be used to determine, for example, the optical thickness variation of each cavity. Furthermore, in some embodiments, phase maps can be used to determine the refractive index variation (i.e., the transverse variation of the refractive index) and physical thickness variation of a transparent measurement object in a cavity.

Moreover, by first acquiring high-resolution frequency spectra of the frequency transformed data, one can determine correspondingly accurate values of the peak frequencies of each cavity. Such accurate values of the peak frequencies enable measurements of the absolute optical thickness of each cavity. In some embodiments, this allows the determination of absolute physical thickness and absolute refractive index values of measurement objects in the cavity.

Figure 1:
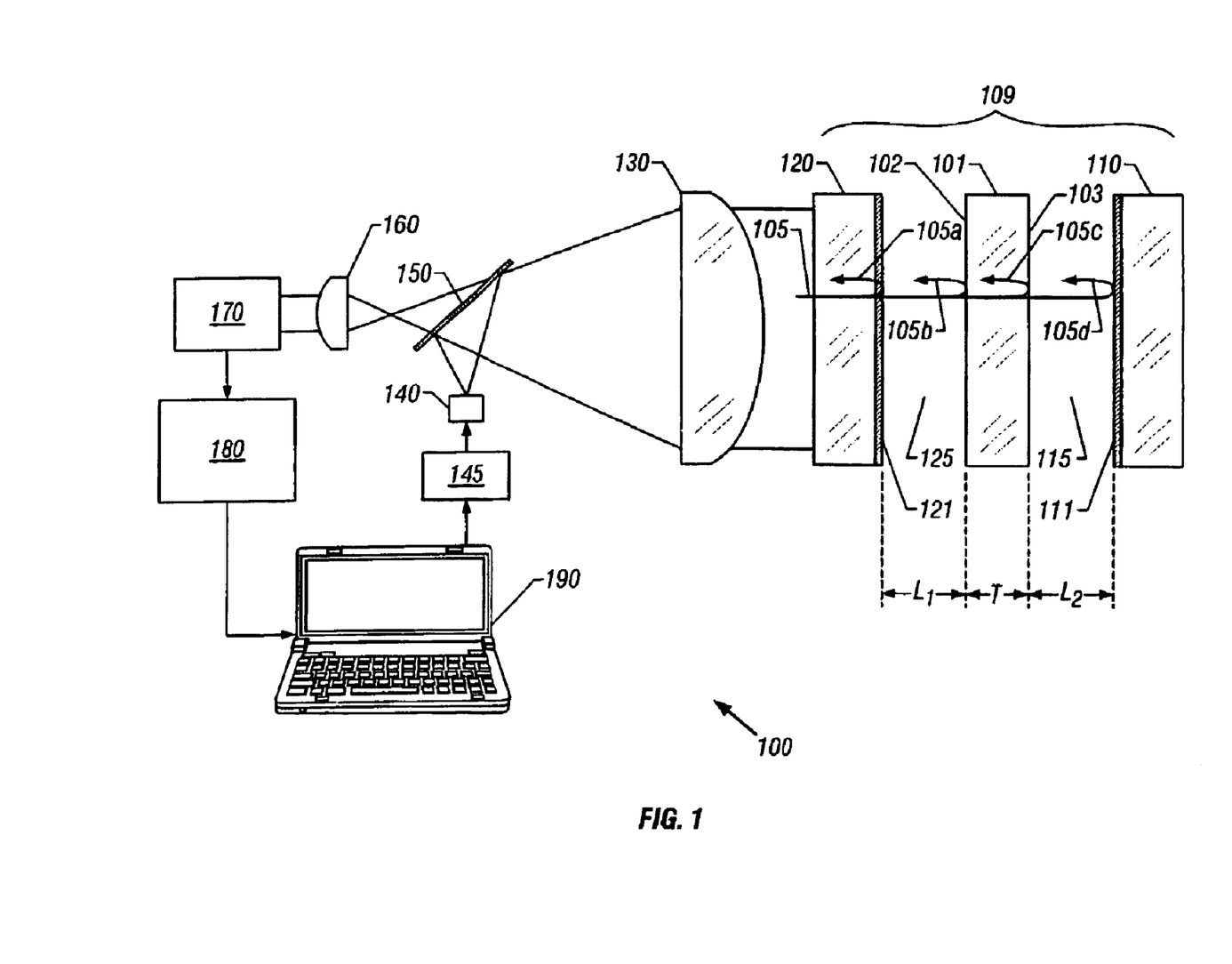
FIG. 1 is a schematic diagram of an interferometer apparatus having a cavity with multiple surface pairs.

A schematic diagram of such an interferometer system 100 is shown in FIG. 1. System 100 is adapted to measure the optical interference between reflections from the front surface 102 and back surface 103 of a transparent measurement object 101 (e.g., an optical flat. The optical interference measured includes contributions from additional reflections from surfaces 111 and 121 of reference objects 110 and 120, respectively. For example, reference objects 110 and 120 may be reference flats having well-characterized surfaces. More generally, however, the references surfaces defined by surfaces 111 and 121 need not be well-characterized. Surface 102 is separated from surface 121 by a gap 125, and surface 103 is separated from surface 111 by another gap 115. System 100 includes a mount for positioning object 101 relative to reference objects 110 and 120, and a computer 190. System 100 additionally includes a tunable light source 140 (e.g., a laser diode), a driver 145 connected to light source 140 for adjusting the optical frequency of its output, a beam splitter 150, a collimating optic 130, an imaging optic 160, a CCD camera 170, and a frame grabber 180 for storing images detected by camera 170. In some embodiments, a single device can perform both control and measurement functions (e.g., frame grabber 180 may be incorporated in computer 190). Driver 145 tunes the optical frequency v of light source 140, through a frequency range $\Delta v$ about a nominal optical frequency of $v_0$.

During operation, controller 190 causes driver 145 to control the optical frequency of light emitted by light source 140 and causes frame grabber 180 to store an image of the optical interference detected by CCD camera 170 for each of the specified optical frequencies. Frame grabber 180 sends each of the images to controller 190, which analyzes them using a PSI algorithm. In some embodiments, driver 145 linearly modulates the optical frequency of the light source 140 as the series of interference images are being recorded. Alternatively, in other embodiments, the driver can modulate the optical frequency in discrete steps or according to other functions.

During operation, light source 140 directs light 105 having an optical frequency v to beam splitter 150, which then directs the light to collimating lens 130 to collimate the light into a plane field. Optionally, a second beamsplitter (not shown) directs a portion of the light to an optical frequency monitor, described further below with reference to FIG. 5. Surface 121 reflects a first portion of the light 105 to form a first reference wavefront 105a, and surfaces 102 and 103 of object 101 reflect additional portions of light to form wavefronts 105b and 105c respectively. Surface 111 also reflects a portion of light to form a second reference wavefront 105d. Lenses 130 and 160 then image wavefronts 105a, 105b, 105c, and 105d onto CCD camera 170 where they form an optical interference pattern. The optical interference pattern also includes contributions from higher order reflections within cavity 109. Higher order reflections include, for example, interference between light reflecting from surface 121 and light that reflects first off surface 102, then by surface 121, and then again by surface 102.

In the analysis that follows, we first consider the optical interference pattern produced by optical frequency tuning in an elemental two-surface interferometer cavity, for example, the cavity formed by surface 121 and surface 102. The surfaces are separated by a physical gap L and contain a medium with a refractive index n. For example, the gap can be filled with air, which has a refractive index of about one. The product of refractive index and gap thickness, nL, is referred to as the optical thickness (for air this is equal to the physical thickness, L). The total phase difference, $\phi$, between light rays with wavenumber k reflected from surface 121 and light rays which reflect from surface 102 p times is given by:

$$\varphi(x, y) = 2pknL(x, y) + \Phi = 2pnL(x, y)\frac{2\pi v}{c} + \Phi, \quad (1)$$

where v is the optical frequency of the light, c is the speed of light, and $\Phi$ is an overall constant phase. The x and y dependence of gap L and phase $\phi$ are shown explicitly in EQ. 1 to show the spatial variation in phase. In some embodiments, refractive index n may also have an x and y dependence. Extraction of this phase variation profile, or phase map, is the information that is typically of interest in PSI. This explicit x and y dependence will be omitted in the equations that follow for the sake of clarity.

Tuning the source optical frequency, v, produces an interferometric phase variation, $\phi$, that depends on the optical frequency tuning rate, $\dot{v}$, and the cavity optical path difference 2 pnL as $$\dot{\varphi} = \frac{4\pi pnL\dot{v}}{c}, \quad (2)$$

where the dot represents differentiation with respect to time. The cavity interference therefore varies at a frequency $f_C$, which is given by $$f_C = \frac{2pnL\dot{v}}{c}, \quad (3)$$

Accordingly, in an elemental cavity, multiple reflection events produce interference at frequencies that are harmonics of the $1^{st}$ order (i.e., p=1) frequency.

In some embodiments, frequency $f_C$ can be determined from EQ. 3 if nominal values for the optical thickness, nL, and optical frequency tuning rate, $\dot{v}$, are known.

In addition, the frequency $f_C$ can be identified by transforming the interference intensity data measured by CCD camera 170 into the frequency domain (e.g., by using a Fourier transform) to produce a frequency spectrum and identifying the frequency of the corresponding peak in the spectrum.

Once $f_C$ has been determined, and for substantially linear frequency tuning, the interferometric phase of any elemental cavity can be recovered from the complex amplitude of the Discrete Fourier Transform (DFT) of the interference, evaluated at the representative first-order frequency, $f_C$, for that cavity:

$$\varphi = \tan^{-1}\left(\frac{\text{Im}(DFT(f_C))}{\text{Re}(DFT(f_C))}\right), \quad (4)$$

where $$DFT(f_C) = \sum_{j=0}^{N-1} I_j W_j \exp\left[i\frac{\pi j f_C}{f_S}\right]. \quad (5)$$

In EQ. 5, $I_j$ is the intensity sample measured at the $j^{th}$ optical frequency of the optical frequency tune. N is the total number of intensity samples acquired. $W_j$ are the sampling weights associated with a Fourier window, W, and $f_S$ is the sampling rate. Fourier window, W, is usually selected to suppress contributions to the phase evaluation from additional frequencies far from $f_C$, and from the effect of finite observation intervals. Examples of Fourier windows include Hamming windows and Tukey windows. The Tukey window can be advantageous in embodiments having one or more additional frequency peaks close to $f_C$ as the taper width of the window can be chosen to effectively zero-weight these additional frequencies at $f_C$.

Extraction of the phase, $\phi$, for each CCD pixel gives a phase distribution $\phi(x, y)$ (i.e., phase map) for the cavity. Variations in optical thickness (i.e., the relative optical thickness) can be determined from EQ. 1. Moreover, for the case where the surface profile of the reference surface 121 is already known, the phase distribution can be used to determine the surface profile of surface 102. It is noted that the results of the phase extraction defined by EQs. 4 and 5 generates phases modulo $2\pi$. These phase ambiguities can be accounted for in the phase map using conventional $2\pi$ phase ambiguity unwrapping techniques, commonly known in the art.

The phase extraction analysis discussed above provides the relative information about the cavity (i.e., variations from pixel to pixel). It is also possible to determine absolute information about the cavity. According to EQ. 3, one can determine the absolute optical thickness nL from the first-order peak frequency $f_C$, and the frequency tuning rate $\dot{v}$. The accuracy of this determination, however, depends on the accuracy with which $f_C$ and $\dot{v}$ can be determined. Moreover, the x and y dependence of the absolute optical thickness nL can be determined by separately identifying the first-order frequency $f_C$ from interference intensity data corresponding to each pixel of CCD camera 170.

In some embodiments, a high-resolution frequency spectrum of a small portion of the cavity (e.g., corresponding to one CCD pixel) can be obtained in order to accurately determine $f_C$. From this, an accurate value for the optical thickness of the cavity can be determined for that portion of the cavity. In a separate measurement, a low-resolution frequency spectrum of the entire cavity can be obtained. Using EQ.'s 4 and 5, this information can be used to determine the phase map and optical thickness variation of the cavity. The optical thickness of the entire cavity can then be determined by referencing the variation in optical thickness to the optical thickness determined for the small portion of the cavity. Parameters affecting the frequency spectrum resolution and spectral resolution limit are discussed below.

The analysis above adequately describes the situation where object 101 is opaque, and only the reflections from surface 102 of object 101 need be considered. However, in some embodiments, object 101 is transparent, and reflections from surfaces 121, 102 and 103 should be considered. In the analysis that follows, reflections from surface 111 of reference flat 110 can be ignored. For example, reference flat 110 can be replaced by a non-reflective beam stop. There are now three elemental two-surface cavities corresponding to surface pairs 121 and 102, 121 and 103, and 102 and 103, respectively. Surface 121 and surface 102 are separated by a distance L (i.e., gap 125). In what follows, gap 125 is assumed to be filled with air and have a refractive index equal to one. Object 101 has a thickness T and a refractive index n. Assume that the interferometer is configured so that all elemental cavities have unique OPD's. The $1^{st}$ order frequencies are then spectrally separated and the interferometric phase of any elemental cavity can be extracted using the frequency decomposition and phase extraction given by EQ.'s 4 and 5. Thus, both the relative and absolute optical thickness profiles can be made simultaneously for multiple elemental cavities.

To accurately determine the peak frequency $f_C$ for each cavity (necessary for accurate absolute optical thickness measurements), it is necessary to spectrally resolve each peak of interest. The spectral resolution limit of a Fourier decomposition is inversely proportional to the observation time, hence the minimum resolvable interference frequency is $$f_{\min} = \frac{1+\mu}{\Delta t} = \frac{(1+\mu)f_S}{N}. \tag{6}$$

All first order frequencies should be separated by $f_{min}$ to be resolved. The parameter $\mu$ is introduced as a practical matter. The theoretical resolution limit occurs when $\mu=0$, but in practice, the minimum resolvable frequency should be somewhat larger to account for potential instrumental deficiencies and phase error sensitivities.

Setting $f_C = f_{min}$, EQ. 3 implies that the minimum resolvable optical path difference for a tuning range of $\Delta v_{max}$ is given by $$\Gamma = \frac{c(1+\mu)}{\Delta v_{\max}}. \tag{7}$$

This turns out to be, for example, 3.75 millimeters for an 80 gigahertz maximum tuning range if $\mu=0$. The primary cavity gaps should be greater than the limits imposed by EQ. 7 in order to separate the first order frequencies. Furthermore, if it is desired to accurately determine the first-order peak frequencies, the tuning range must be larger than that required by EQ. 7.

The analysis methodology adopted can now be summarized: the interferometer cavity is constructed to create a unique OPD for each elemental cavity, thereby assuring unique interference frequencies via EQ. 3. The interferogram is then sampled while the optical frequency is varied. The interferogram recorded at each pixel may then spectrally decomposed with a frequency transform, such as a Fourier transform, and the $1^{st}$ order frequency peaks corresponding to the elemental cavities are identified from the transformed data.

In some embodiments, frequency transforms at the specific $1^{st}$ order frequencies using EQ. 5 are applied to the data to evaluate the phase map (using EQ. 4) of each elemental cavity separately. The phase maps can be used to determine information such as, for example, the surface profile of one or more of the cavity surfaces, and/or the relative optical thickness of one or more of the elemental cavities.

Alternatively, or in addition, the peak frequency values themselves can be used to determine the absolute optical thickness of the corresponding cavity provided the tuning range provides sufficient resolution. Information about the optical thickness and optical thickness variation of each cavity can be combined to determine a complete optical thickness profile of each cavity.

In some embodiments, FTPSI can be used to determine the surface profile of a discontinuous surface, for example a stepped surface. For instance, consider side 420 of an object shown in FIG. 2. Side 420 has two parallel surfaces 420a, and 420b, offset by a height, h. Surfaces 420a and 420b are substantially parallel to reference flat surface 410. Surface pairs 410 and 420a, and 410 and 420b are separated by gaps 430 and 440, respectively.

Figure 2:
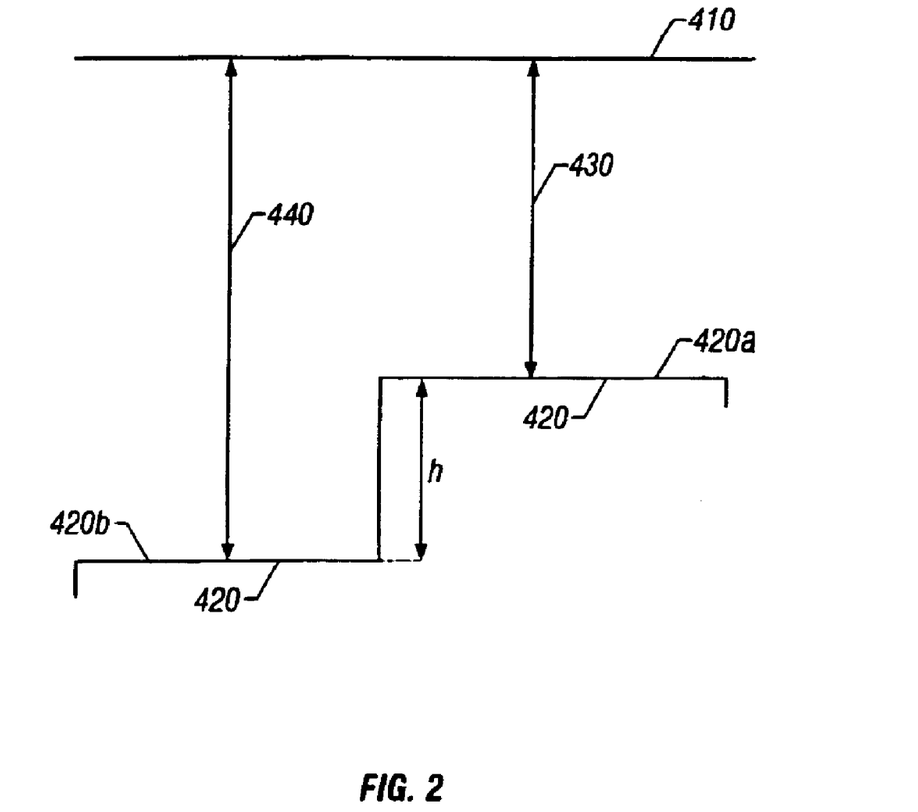
FIG. 2 is a schematic diagram of an interferometer cavity involving discontinuous surfaces.

FTPSI analysis of side 420, as described above, will yield different peak frequencies for the gaps 430 and 440. Surface profiles for surfaces 420a and 420b can be obtained by analysis of each cavity's spectra as described above. Additionally, the step height between surfaces 420a and 420b can be found by comparing the optical thickness variation of gaps 430 and 440. Of course, this information can be obtained for discontinuous surfaces in cavities having more than two surfaces.

The analysis above can be further extended to treat a four-surface cavity, such as four-surface cavity 109 shown in FIG. 1. This cavity produces six elemental two-surface cavities. For brevity, the cavity bounded by surface 102 and 103, for example, is denoted 102:103. Hence the six elemental cavities are 121:102, 121:103, 121:111, 102:103, 102:111, and 103:111, respectively. The values of the primary gaps 125 and 115 must be chosen so that all the elemental cavities have unique OPD's, and hence unique $1^{st}$ order frequencies. Gap 125 has a length $L_1$ (this was denoted as L in the three-surface cavity treatment) and gap 115 has a length $L_2$.

Resolvable $1^{st}$ order frequency peaks enables the user to extract the spatial phase variation and hence the relative optical thickness for each cavity according to EQs. 4 and 5. Furthermore, provided the optical frequency tuning rate $\dot{v}$ is known and the frequencies are resolved to a sufficient accuracy, the absolute optical thickness of each respective cavity can be determined using EQ. 3.

Moreover, it is possible to determine the refractive index variation, or homogeneity, of object 101 using the information obtained by FTPSI analysis. The index variation can be obtained with high precision, assuming nominal values for the index $\bar{n}$ and plate thickness $\bar{T}$ are available. From EQ. 1, the total phase observed at each primary cavity correspond to:

$$\phi_{121:102} = 2\,kL_1 \quad \phi_{102:103} = 2\,knT, \quad \phi_{103:111} = 2\,kL_2 \tag{8}$$

where $$k = \frac{2\pi v}{c}.$$

A similar equation is found for the phase variation of the 121:111 cavity with object 101 removed:

$$\phi_{121:111} = 2\,k(L_1 + T + L_2) \tag{9}$$

Solving for the refractive index of object 101, n, yields $$n = \frac{\varphi_{102:103}}{\varphi_{121:111} - \varphi_{103:111} - \varphi_{121:102}}. \tag{10}$$

Since these phases represent total phases, and not the $2\pi$ modulo phases obtained from the DFT, we can write for any cavity $$\phi = 2\,\overline{knL} + \varphi, \tag{11}$$

where $\bar{n}$ and $\bar{L}$ are nominal values of the index and gap, and $\varphi$ is the local phase deviation from the total phase. Substituting EQ. 11 for each of the individual phases in EQ. 10 produces $$n = \frac{2k\bar{n}\bar{T} + \phi_{102:103}}{2k\bar{T} + \phi_{121:111} - \phi_{103:111} - \phi_{121:102}}. \tag{12}$$

For cases where $2\,k\bar{T} \gg \phi_{121:111} - \phi_{103:111} - \phi_{121:102}$, and ignoring terms of $$\frac{1}{2k\bar{T}}$$

higher than first order, the index variation of object 101, $\Delta n = n - \bar{n}$, is given by $$\Delta n = \frac{\phi_{102:103} - \bar{n}(\phi_{121:111} - \phi_{103:111} - \phi_{121:102})}{2k\bar{T}}. \tag{13}$$

The $\phi$'s are determined from their respective modulo-$2\pi$ phase maps, keeping in mind that $\phi_{121:111}$ is the phase maps of the empty cavity. Determination of the physical thickness variation of object 101, $T - \bar{T}$, follows similarly, or may, for example, be determined directly from EQ. 13 and a measure of the optical thickness variation of object 101.

The phase maps of the primary cavities 121:102, 102:103, and 103:111 are acquired simultaneously in a single measurement. As a result, the relative orientations of the spatial phase variations are preserved. Accordingly, it is possible to determine linear variations in the homogeneity of the object (also called the homogeneity wedge) using the FTPSI analysis described above.

Maintaining identical conditions from measurement to measurement places stringent demands on tuning repeatability and cavity stability. Removal or insertion of object 101 from cavity 109, for example, can introduce changes in the physical alignment of reference surfaces 121 and 111. This, in turn, can lead to errors in the measured homogeneity of object 101. In some embodiments, cavity 109 can be prepared such that the aperture presented by object 101 is smaller than the observable aperture of the cavity. In this case, a portion of cavity 109 will be a two-surface cavity, while the portion including object 101 will be a four-surface cavity. The portion corresponding to the two-surface cavity can function as a control/calibration for the measurement in which object 101 is removed, as any variation in the optical path length of the 121:111 cavity in these areas will correspond to a change in the alignment of flats 120 and 110. Any changes in the pitch and yaw of the system between the two measurements can be compensated for in the analysis.

It is also possible to determine the absolute refractive index and the absolute physical thickness of object 101 from the four surface cavity measurement. The phase variation for each of the primary cavities are given by:

$$\dot{\varphi}_{121:102} = \frac{4\pi \dot{v} L_1}{c}, \tag{14a}$$

$$\dot{\varphi}_{102:103} = \frac{4\pi \dot{v} n T}{c}, \tag{14b}$$

$$\dot{\varphi}_{103:111} = \frac{4\pi \dot{v} L_2}{c}, \tag{14c}$$

$$\dot{\varphi}_{121:111} = \frac{4\pi \dot{v}(L_1 + T + L_2)}{c}. \tag{14d}$$

Again, EQ. (14d) refers to a measurement of the 121:111 cavity made with object 101 removed. Solving for the index yields $$n = \frac{\dot{\varphi}_{102:103}}{\dot{\varphi}_{121:111} - \dot{\varphi}_{103:111} - \dot{\varphi}_{121:102}}. \tag{15}$$

Here the $\dot{\varphi}$ represent the phase variation observed from each cavity under identical cavity and tuning conditions. Using EQ. 14b and EQ. 15, the absolute physical thickness of object 101 can be found via $$T = \frac{c(\dot{\varphi}_{121:111} - \dot{\varphi}_{103:111} - \dot{\varphi}_{121:102})}{4\pi \dot{v}} \tag{16}$$

In embodiments where the frequency resolution of the respective first-order peaks is sufficient, absolute measures of homogeneity and physical thickness can be determined from EQs. 15 and 16, respectively, based on EQs. 2 and 3 for each respective cavity. In other embodiments, however, such absolute properties may determined using a phase extraction techniques as described in the following two paragraphs.

In EQs. 15 and 16, both the numerator and denominator have factors that are rates. Typically, a rate can be expressed as a difference equation, for example, $\dot{\phi} = \Delta\phi/\Delta t$. Accordingly, one need only calculate the total change in the respective phases of EQ. 15 during the same period the optical frequency is tuned over a specific range Δv in order to determine the absolute index of object 101. Similarly, one need only calculate the total change in the respective phases of EQ. 16 during the same period the optical frequency is tuned over a specific range Δv in order to determine the absolute physical thickness of object 101.

An optical frequency monitor may be used to determine the optical frequency tune, Δv. The phase changes may be determined through a Fourier phase extraction technique known as a sliding window phase analysis, whereby a phase is extracted from a Fourier analysis of a windowed subset of the data, and the phase evolution determined as the window is slid in time across the total data set. Accordingly, this typically requires a larger data set than that used for relative optical thickness measurements.

As described above, an optical frequency monitor (also referred to herein as a wavelength monitor) may be used to determine the frequency tune Δv in EQ. 16. Furthermore, in embodiments based on EQ. 3, accurate knowledge of the frequency tuning rate $\dot{v}$ may be determined using an optical frequency monitor so that the absolute optical thickness of an elemental cavity may be determined from its corresponding first-order frequency. The frequency monitoring can be provided by a monitor cavity with a well known OPD.

Assuming the monitor cavity has an optical gap given by $L_M$ and experiences a phase variation $\phi_M$ during the tune, then EQ. 16 may be rewritten as:

$$T = \frac{L_M(\varphi_{121:111} - \varphi_{103:111} - \varphi_{121:102})}{\varphi_M} \quad (17)$$

The monitor cavity can additionally relax the linear tuning requirement for the DFT evaluation described above in EQ. 5. This is achieved by calculating the phase shift increment between each sample directly from the monitor phase variation. For example, consider a test cavity having an OPD $D_T$, and a monitor cavity having a fixed OPD $D_M$. The DFT used to measure the test phase is $$DFT(f_C) = \sum_{j=0}^{N-1} I_j W_j \exp(i\Delta\varphi_{Tj}) \quad (18)$$

where $\Delta\phi_{Tj}$ is the overall interferometric phase shift of the test cavity for time sample j. For a constant optical tuning rate $\dot{v}$, $$\Delta\varphi_{Tj} = \frac{2\pi \dot{v} D_T}{c}. \quad (19)$$

For a non-constant $\dot{v}$ the interferometric phase shift of the test cavity for time sample j can be determined from the monitor via $$\Delta\varphi_{Tj} = \Delta\varphi_{Mj} \frac{D_T}{D_M}. \quad (20)$$

Implementation of the optical frequency monitors may include dimensional stability for repeatable tuning characteristics and feedback signals for real-time control of the optical frequency ramp. Furthermore, the monitor should have resolution that is fine enough for the longest interferometer cavities and yet track the optical frequency over the full tuning range.

Optical frequency monitors can be included in any part of the optical path of system 100. For example, the monitor cavity may correspond to two reference surfaces placed before, after, or surrounding measurement object 101. In particular, for example, the monitor cavity can be cavity 121:111, defined by reference flats 120 and 110. Alternatively, a beam splitter may be positioned to direct a small portion of the light from source 140 directly into a separate monitor cavity.

Figure 3:
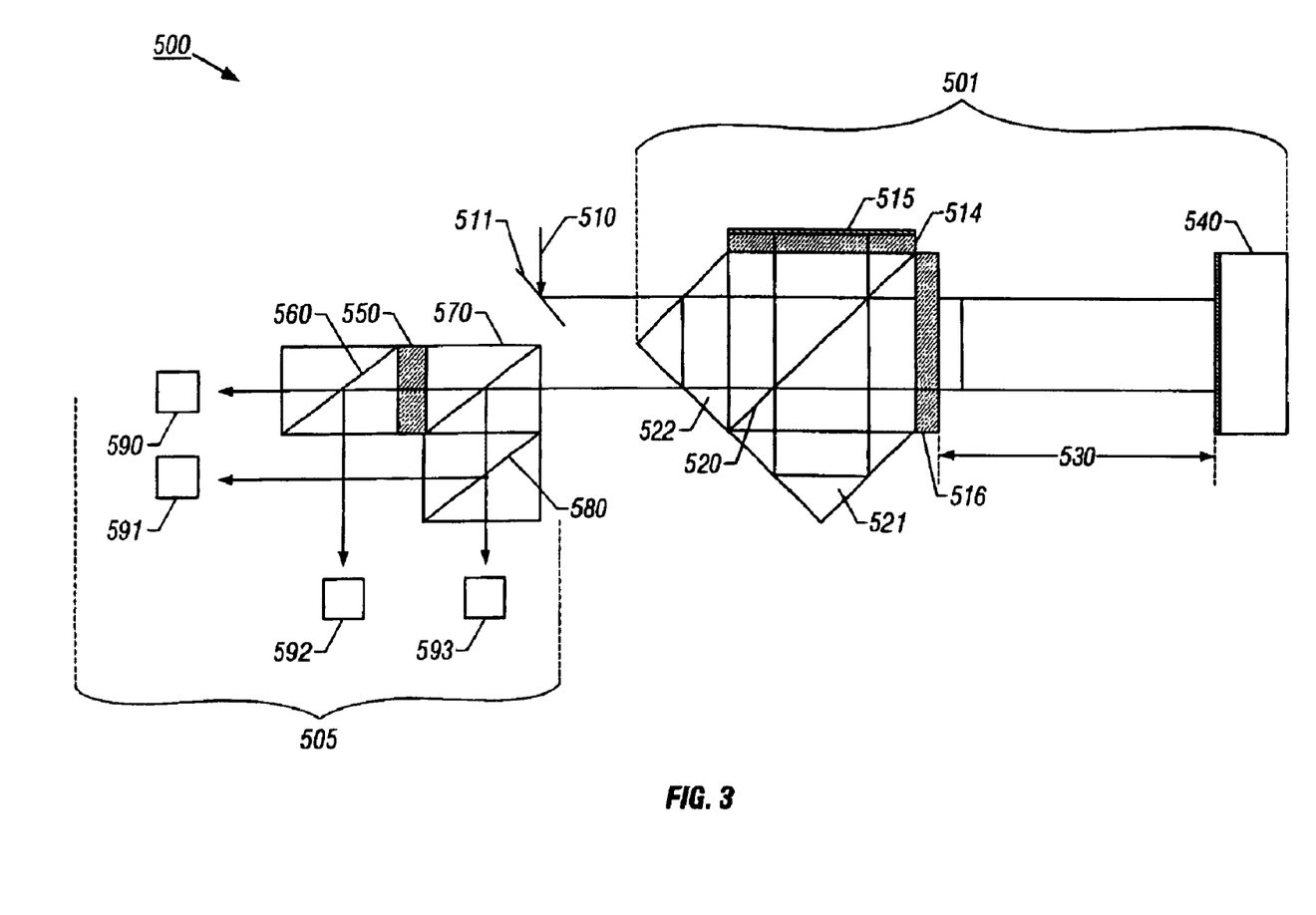
FIG. 3 is a schematic diagram of a wavelength monitor for use with the interferometer apparatus of FIG. 1.

An example of an optical frequency monitor, monitor 500, is shown in FIG. 3. Monitor 500 is a homodyne interferometer that includes a high stability plane mirror interferometer (HSPMI) 501 and a quadrature detector 505. HSPMI 501 includes a polarizing beamsplitter 520, reflectors 515 and 540, quarter-wave plates 514 and 516, corner cube retro-reflector 521, and roof prism (or split retro-reflector) 522. Quadrature detector 505 includes four detectors 590, 591, 592, and 593, beamsplitter 570, polarizing beamsplitters 560 and 580, and quarter-wave plate 550. The whole assembly is ideally mounted on a low expansion plate, for example, one formed from Zerodur or Invar. If necessary, the plate can be thermally controlled with a resistive heater element.

A polarized input beam 510 from light source 140 is directed into HSPMI 501 via reflector 511. Roof prism 522 is positioned below the plane of the page, such that the input beam to the interferometer passes over it. In some embodiments, the input beam is linearly polarized at 45°, or it can be circularly polarized. Beamsplitter 520 splits the input beam into orthogonally polarized reference and measurement beams. The reference beam is twice directed between mirror 515 and cube-corner retro-reflector 521 before being directed to roof prism 522. Similarly, the measurement beam is twice directed between mirror 540 and cube-corner retro-reflector 521. Following the second pass to mirrors 515 and 540, respectively, cube-corner retro-reflector 521 lowers the reference and measurement beams to the plane of roof prism 522, which causes the beams to make two additional passes to mirrors 515 and 540. Thereafter, the beams are recombined into an output beam, which is directed to quadrature detector 505.

Quadrature detector 505 mixes the two polarizations emitted from HSPMI 501 producing a beam containing an interference signal proportional to the OPD of the monitor and the optical frequency tuning rate. Quadrature detector 505 further produces four replicas of the interference beam with the interference phase of each replica shifted by 90 degrees. By monitoring the intensity, $D_x$ (where x refers to the detector), of each replica during the tune, the phase of the monitor cavity can be determined as $$\phi = \arctan\left[\frac{D_{590} - D_{592}}{D_{593} - D_{591}}\right], \quad (21)$$

from which the overall interferometric phase shift at each time sample can be determined.

In other embodiments, the optical frequency monitor is not limited to the homodyne interferometer described above. Generally, any monitor capable of determining optical frequency and optical frequency tuning rate to the required accuracies during the FTPSI measurement process is acceptable. For example, a heterodyne interferometer could perform this function.

In all embodiments, it is important that the $1^{st}$-order frequencies of interest are isolated from all other interference frequencies generated by the interferometer, including frequencies generated by multiple interference cavities (p>1 in EQ. 3). This is achieved through specific interferometer geometries. The following outlines a procedure for specifying the interferometer geometry that guarantees sufficient isolation for all frequencies out to $2^{nd}$-order (p=2 in EQ. 3). A 4-surface interferometer is used as an example but the procedure is applicable to interferometers of any number of surfaces.

Figure 4:
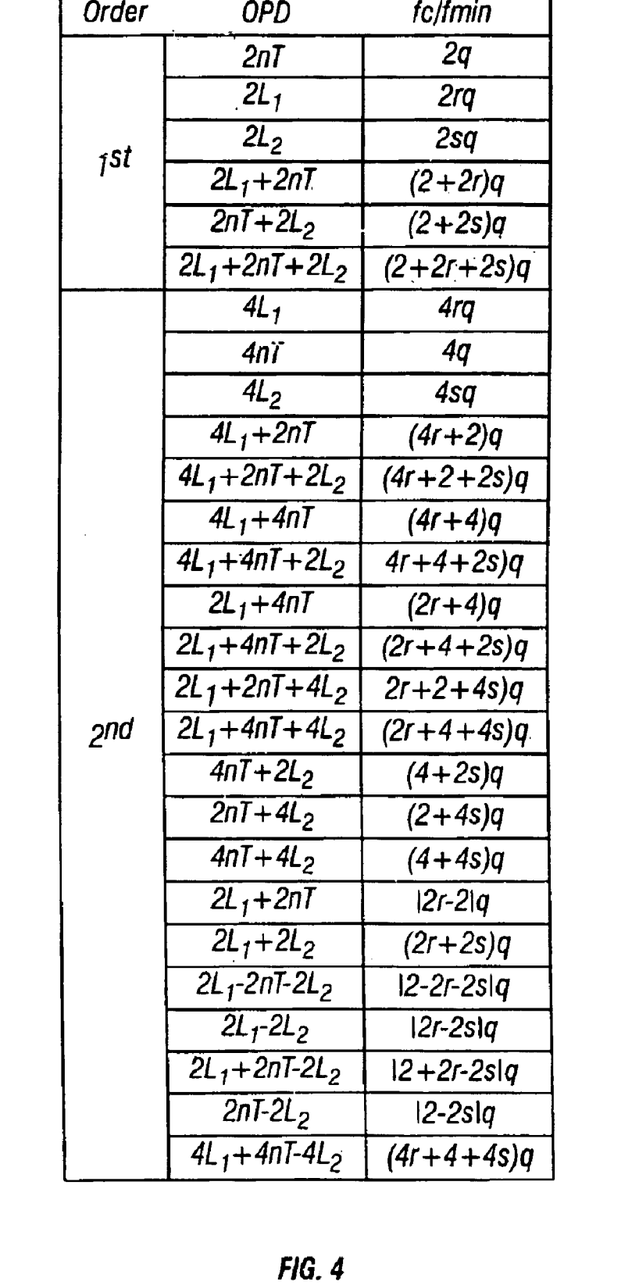
FIG. 4 is a table showing first- and second-order frequencies produced by a four-surface cavity.

Consider the four surface cavity of system 100. The four surfaces produce six $1^{st}$ order frequencies and twenty-seven $2^{nd}$ order frequencies from 14 topologically distinct beam paths. Six of the twenty-seven $2^{nd}$ order frequencies are identical to the $1^{st}$ order frequencies and cannot be separated, but these contribute only an overall DC shift to the phase evaluation. The $1^{st}$ order frequencies are not all independent, so it is not necessary to measure all six, however to be general, all six frequencies are positioned to minimize the interference from neighboring $2^{nd}$ order frequencies and each other. In terms of the primary gaps, the effective OPD's for the six $1^{st}$ order cavities and the twenty-one different $2^{nd}$ order cavities are given in the $2^{nd}$ column of the table shown in FIG. 4. The gaps given in table with EQ. 3 can be used to obtain the interference frequencies.

It is convenient to express the primary OPD's in terms of the minimum resolvable OPD, $\Gamma$, as defined in EQ. 7. We define the ratio q as $$q = \frac{nT}{\Gamma}, \quad (22)$$

and the ratio's of the lengths, $L_1$ and $L_2$, of the primary gap's 125 and 115, respectively, to object 101 optical thickness, nT, are expressed as $$r = \frac{L_1}{nT} = \frac{L_1}{\Gamma q} \quad (23a)$$

$$s = \frac{L_2}{nT} = \frac{L_2}{\Gamma q}. \quad (23b)$$

Using EQ.'s 3, 6, and 7, we can normalize the interference frequencies $f_C$ with respect to $f_{min}$ and can express these normalized frequencies as functions of r and q. The normalized independent $1^{st}$ and $2^{nd}$ order frequencies for the three-surface cavity are listed in the third column of the table in FIG. 4. All these frequencies scale with q, so the tuning range is adjusted to cancel this dependence:

$$\Delta v = \frac{\Delta v_{max}}{q}. \quad (24)$$

If nT is assumed to be the smallest optical gap, a search for values of r and s greater than one that maximizes the separation of the $2^{nd}$ order from the $1^{st}$ order frequencies reveals that r=3, s=9 is one such combination. In general, a complete analysis shows that optimal cavity geometries are geometries in which the ratio of the optical path lengths of any two primary gaps is a unique power of three. A similar analysis follows if a different primary gap is assumed to be the smallest.

With the tuning range, $\Delta v$, and the gaps, $L_1$ and $L_2$, now fixed, it remains only to determine the number of samples, N, to be taken. This is selected such that the largest $2^{nd}$ order frequency (i.e., (4r+4+4s)q corresponding to OPD $4 L_1 + 4 nT + 4 L_2$) after being aliased to lower frequencies, is still greater than the largest $1^{st}$ order frequency by at least twice the spectral resolution limit. This constraint, for the four-surface cavity, predicts $$N = (1+\mu)(6r+8+6s), \quad (25)$$

which evaluates to 80 samples if $\mu=0$, for example.

Figure 5:
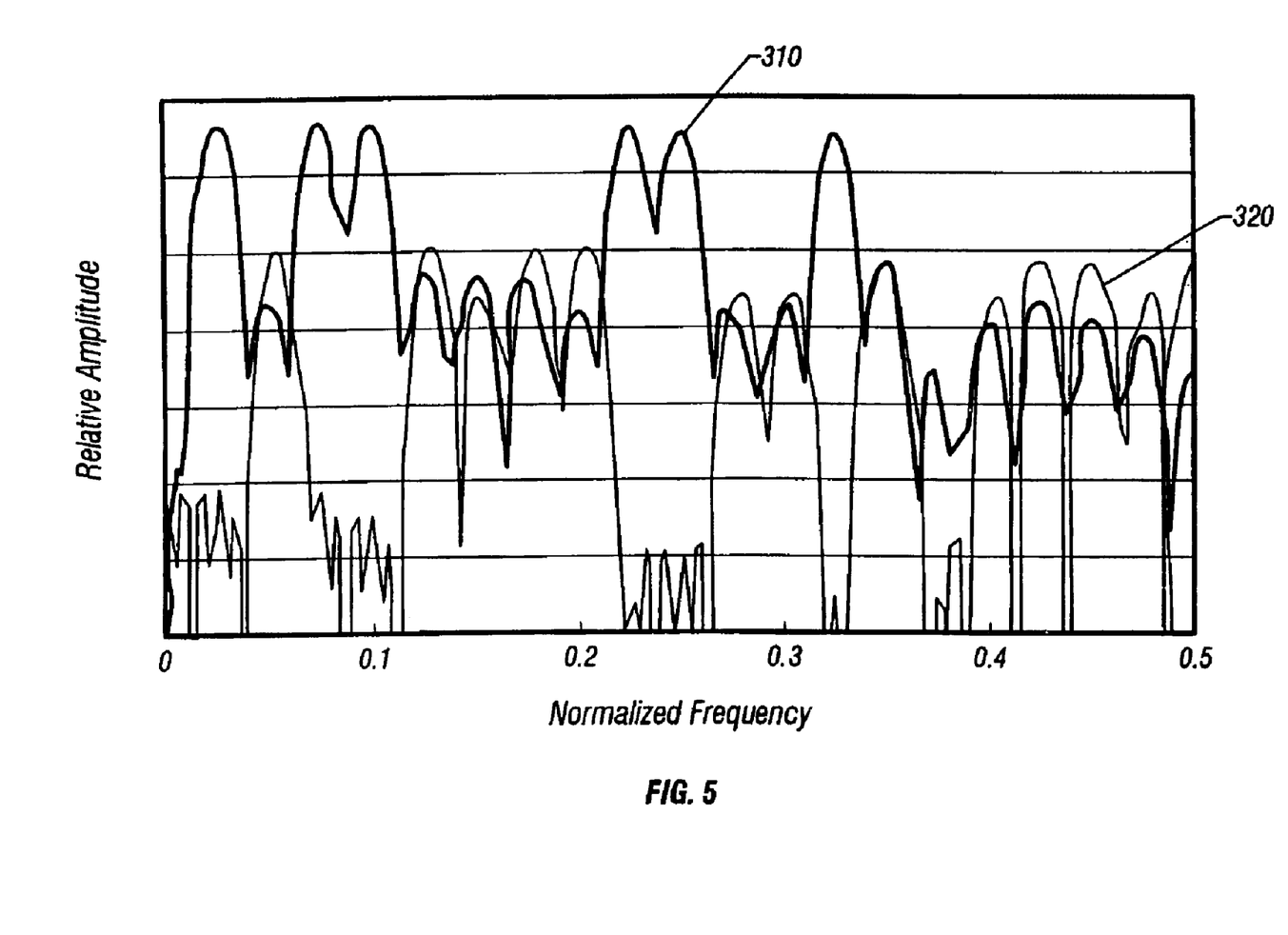
FIG. 5 is a graph shown the relative amplitude of first- and second-order frequencies produced by a four-surface cavity.

EQ.'s 24 and 25, and with r=3 and s=9, together define an optimum cavity geometry and $1^{st}$ order frequencies. FIG. 5 shows the interference spectrum 310 predicted for this configuration. The spectrum of $2^{nd}$ order cavity frequencies 320 is also shown to highlight the excellent separation between the $1^{st}$ and $2^{nd}$ order peaks.

In general, there are infinitely many possible configurations of a four surface cavity that yield optimal $1^{st}$ order frequency separation. These correspond to cavities in which the ratios r and s are $3^x$ and $3^y$, respectively, where are x and y are integers, and x≠y≠0. Another possible configuration is one in which r and s are both scaled by a constant greater than one.

Of course, the invention is not limited to configurations of the cavity surfaces having optimal configurations. In some embodiments, a portion of the elemental cavities (e.g., the cavities of interest) are optimally configured. The other elemental cavities can be non-optimally configured. For example, the other elemental cavities can be configured to have non-optimal OPD's that are substantially different to the OPD's of the cavities of interest.

In the descriptions above, FTPSI was explained with reference to two-surface, three-surface, and four-surface cavities. The invention, however, is not so limited. This analysis can be extended to cavities with any number of surfaces. A cavity with any arbitrary number of surfaces can be reduced to a combination of the elemental two-surface cavities corresponding to each surface pair. As long as the frequencies of the phase-shifts corresponding to the two-surfaced cavities of interest can be resolved and are sufficiently isolated from other frequencies, the analysis will produce useful information about that cavity.

The light source for the phase-shifting interferometry system can be a laser such as a gas, solid-state, tunable dye or semiconductor laser. The light source can also be a white-light source with a tunable narrow-band spectral filter. Furthermore, in some embodiments the light source can operate at multiple nominal optical frequencies to resolve phase cycling ambiguities in the extracted phase profiles. For example, the light source could operate adjustably between the multiple lines of a HeNe, Argon, or diode laser. Also, in some embodiments the light source can be coupled to the interferometer by an optical fiber. The optical frequency tuning of the light source can be accomplished internal or external to the light source. For example, the cavity length of a laser light source can be thermally or by piezo-mechanically modulated, to adjust the optical frequency of the laser output. Similarly, the injection current to the gain medium of a laser light source can be modulated to adjust the optical frequency of the laser output. Alternatively, for example, the optical frequency output of the light source can be adjusted externally by acousto-optic, electro-optic, or opto-mechanical modulation.

In some embodiments, the light source for the PSI system can be a polarized light source (e.g., linearly polarized light). For example, system 100 can include a polarizing element in order to polarize the light from the lightsource. Each of the above-described measurement techniques can be performed as a function of the polarization state of the light. For example, the refractive index measurement technique could be performed for multiple different known polarization states (at least two polarization states, e.g., orthogonal polarization states). Variations in the refractive index, optical thickness, or relative optical thickness of object 101 as a function of polarization can be related to the optical anisotropy of object 101. Accordingly, in some embodiments FTPSI techniques can be used to characterize the optical anisotropy (e.g., birefringence, dichroism, etc.) of a test object or cavity.

Furthermore, although phase-shifting system 100 in FIG. 1 included a Fizeau interferometer, other embodiments can employ an interferometer of a different type such as Twyman Green, Mach Zehnder, Michelson, Fabry-Perot, and grazing-incidence or unbalanced Mirau. Also, the interferometer can be a large aperture, microscope, or fiber optic sensor interferometer.

Moreover, the measurement object can take on many forms. For example, the measurement object can be an optical flat, a photomask, a flat-panel display, or a silicon wafer (which could involve infrared illumination). Furthermore, the measurement object can be a cemented optic or an air-spaced optical assembly. The measurement object can also be or include a spherical or aspherical dome, contact lens, meniscus lens, or spectacle lens. Typically, the measurement object is transparent or partially transparent at the wavelength of the light source. More generally, the measurement object is any structure, e.g., micro-machined silicon, that offers optical information relating to surface and/or bulk features of the object. This optical information can relate to the topography of a selected surface of the measurement object or to the optical profile including refractive index homogeneities of all or a selected portion of the measurement object.

In any of the embodiments described above, the computer can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

Furthermore, although the frequency transform used in the above-described analysis is a Fourier transform, the invention is not so limited. Embodiments may also implement other types of frequency transforms, such as Hilbert transforms.

Other aspects, advantages, and modifications are within the scope of the following claims.

What is claimed is:

1. An interferometry method for characterizing a test object, the method comprising:

forming an optical interference image by combining different portions of an optical wave front reflected from multiple surfaces of the test object and at least one reference surface, the multiple surfaces of the test object and the at least one reference surface defining a set of cavity surfaces;

recording an interference signal at different locations of the optical interference image in response to tuning the frequency of the optical wave front over a range of frequencies, wherein the interference signal includes a contribution from each pair of different surfaces in the set of cavity surfaces;

for each location, calculating a frequency transform of the interference signal at a frequency corresponding to each of selected pairs of the different surfaces in the set of cavity surfaces and extracting the phase of the frequency transform at each of the frequencies corresponding to the selected pairs of surfaces; and determining at least one of i) a surface profile of at least one of the test object surfaces and ii) a relative optical thickness profile between two of the test object surfaces, based on at least some of the extracted phases.

2. The method of claim 1, further comprising:

calculating the frequency corresponding to each of the selected pairs of surfaces based on a nominal value for an optical path length difference for each of the selected pairs of surfaces and the frequency tuning rate.

3. The method of claim 1, further comprising:

transforming the interference signal into the frequency domain for at least one of the locations to produce a transformed signal having series of frequency peaks corresponding the pairs of different surfaces in the set of cavity surfaces, and selecting the frequencies corresponding to the selected pairs of surfaces from the series of frequency peaks.

4. The method of claim 1, wherein the selecting of the frequencies corresponding to the selected pairs of surfaces from the series of frequency peaks is based on the relative positions of the cavity surfaces.

5. The method of claim 1, wherein the frequency transform comprises a Fourier transform.

6. The method of claim 5, wherein the Fourier transform is a Fast Fourier transform.

7. The method of claim 5, wherein the Fourier transform is a sliding window Fourier transform.

8. The method of claim 1, wherein calculating the frequency transform comprises multiplying the interference signal with a window function and calculating the Fourier transform of the windowed interference signal at the frequency corresponding to the selected pair of surfaces.

9. The method of claim 8, wherein the window function is selected to reduce a contribution to the frequency transform at the frequency corresponding to one of the selected pairs of surfaces from at least one other pair of different surfaces in the set of cavity surfaces.

10. The method of claim 9, wherein the window function is a Tukey window or a Hamming window.

11. The method of claim 1, wherein the surface profile of at least one of the test object surfaces is determined based on at least some of the extracted phases.

12. The method of claim 11, further comprising:

determining the surface profile of multiple ones of the test object surfaces based on at least some of the extracted phases.

13. The method of claim 12, further comprising:

determining a relative orientation between two of the profiled test object surfaces based on at least some of the extracted phases.

14. The method of claim 1, wherein the relative optical thickness profile between two of the test object surfaces is determined based on at least some of the extracted phases.

15. The method of claim 1, wherein the at least one reference surface comprises one reference surface.

16. The method of claim 15, wherein the test object has a partially transparent front surface and a back surface, the front surface positioned nearer to the reference surface than the back surface, and wherein the front, back, and reference surfaces define a three-surface cavity.

17. The method of claim 1, further comprising:
positioning the test object relative to the at least one reference surface to cause contributions to the interference signals from second order reflections in the set of cavity surfaces to occur at frequencies that differ from the frequencies corresponding to the selected pairs of surfaces.

18. The method of claim 17, wherein the test object is positioned relative to the at least one reference surface such that the optical path lengths of successive, adjacent pairs of the cavity surfaces are substantially proportional to one another by a unique power of 3.

19. The method of claim 1, further comprising:
monitoring the frequency tuning with a wavelength monitor.

20. The method of claim 19, wherein the wavelength monitor comprises an interferometer.

21. The method of claim 19, wherein the calculation of the frequency transform is based on the monitored frequency tuning.

22. An interferometry method for characterizing a test object, the method comprising:
forming an optical interference image by combining different portions of an optical wave front reflected from multiple surfaces of the test object and at least one reference surface, the multiple surfaces of the test object and the at least one reference surface defining a set of cavity surfaces;
recording an interference signal at different locations of the optical interference image in response to tuning the frequency of the optical wave front over a range of frequencies, wherein the interference signal includes a contribution from each pair of different surfaces in the set of cavity surfaces; and
for each location, calculating a frequency transform of the interference signal at a frequency corresponding to each of selected pairs of the different surfaces in the set of cavity surfaces and extracting the phase of the frequency transform at each of the frequencies corresponding to the selected pairs of surfaces,
wherein the at least one reference surface comprises two reference surfaces and the test object is positioned between the two reference surfaces.

23. The method of claim 22, wherein the test object has a partially transparent front surface and a back surface, and wherein the front, back, and two reference surfaces define a four-surface cavity.

24. The method of claim 23, further comprising:
interferometrically measuring a phase profile of a reference cavity formed by the two reference surfaces when the test object is not positioned between the two reference surfaces.

25. The method of claim 24, wherein the reference cavity is formed by removing the test object from between the two reference surfaces.

26. The method of claim 24, wherein the test object defines an aperture smaller than an aperture defined by the two reference surfaces.

27. The method of claim 26, further comprising compensating for the phase profile of the reference cavity for changes in the positions of the reference surfaces between the four-surface cavity measurement and the reference cavity measurement based on the phase profile from each measurement corresponding to the two reference surfaces at the locations outside of the test object aperture.

28. The method of claim 24, further comprising determining a relative homogeneity profile of the test object based on the extracted phases, the relative phase profile of the reference cavity, and nominal values for the test object index and thickness.

29. The method of claim 24, further comprising calculating the absolute physical thickness profile of the test object based on a specified tuning range and a total change in the extracted phases over a period in which the frequency of the optical wave front is tuned over the specified tuning range.

30. The method of claim 29, further comprising determining the specified tuning range using a wavelength monitor.

31. The method of claim 24, further comprising calculating the absolute homogeneity profile of the test object based on a total change in the extracted phases over a period in which the frequency of the optical wave front is tuned over a selected tuning range.

32. An interferometry method for characterizing a test object, the method comprising:
forming an optical interference image by combining different portions of an optical wave front reflected from multiple surfaces of the test object and at least one reference surface, the multiple surfaces of the test object and the at least one reference surface defining a set of cavity surfaces;
recording an interference signal at different locations of the optical interference image in response to tuning the frequency of the optical wave front over a range of frequencies, wherein the interference signal includes a contribution from each pair of different surfaces in the set of cavity surfaces;
for each location, calculating a frequency transform of the interference signal at a frequency corresponding to each of selected pairs of the different surfaces in the set of cavity surfaces and extracting the phase of the frequency transform at each of the frequencies corresponding to the selected pairs of surfaces, and
positioning the test object relative to the at least one reference surface to cause the optical path length difference for each of the pairs of different surfaces in the set of cavity surfaces to differ and contributions to the interference signals from second order reflections in the set of cavity surfaces to occur at frequencies that differ from the frequencies corresponding to the selected pairs of surfaces, wherein the test object is positioned relative to the at least one reference surface such that the optical path lengths of successive, adjacent pairs of the cavity surfaces are substantially proportional to one another by a unique power of 3.

33. An interferometry system for characterizing a test object, the system comprising:
a frequency-tunable light source;
an interferometer comprising at least one reference surface, wherein during operation the interferometer directs different portions of an optical wave front derived from the light source to multiple surfaces of the test object and the at least one reference surface and recombines the different portions to form an optical interference image, the multiple surfaces of the test object and the at least one reference surface defining a set of cavity surfaces;
a multi-element photo-detector positioned to record an interference signal at different locations of the optical interference image in response to frequency tuning of the light source, wherein the interference signal includes a contribution from each pair of different surfaces in the set of cavity surfaces; and an electronic controller coupled to the light source and the photo-detector, wherein during operation the controller, for each location, calculates a frequency transform of the interference signal at a frequency corresponding to each of selected pairs of the different surfaces in the set of cavity surfaces, extracts the phase of the frequency transform at each of the frequencies corresponding to the selected pairs of surfaces, and determines at least one of i) a surface profile of at least one of the test object surfaces and ii) a relative optical thickness profile between two of the test object surfaces, based on at least some of the extracted phases.

34. An interferometry system for characterizing a test object, the system comprising:

a frequency-tunable light source;

an interferometer comprising at least one reference surface, wherein during operation the interferometer directs different portions of an optical wave front derived from the light source to multiple surfaces of the test object and the at least one reference surface and recombines the different portions to form an optical interference image, the multiple surfaces of the test object and the at least one reference surface defining a set of cavity surfaces;

a multi-element photo-detector positioned to record an interference signal at different locations of the optical interference image in response to frequency tuning of the light source, wherein the interference signal includes a contribution from each pair of different surfaces in the set of cavity surfaces; and an electronic controller coupled to the light source and the photo-detector, wherein during operation the controller, for each location, calculates a frequency transform of the interference signal at a frequency corresponding to each of selected pairs of the different surfaces in the set of cavity surfaces and extracts the phase of the frequency transform at each of the frequencies corresponding to the selected pairs of surfaces, wherein the at least one reference surface comprises two reference surfaces and the interferometer is configured to position the test object between the two reference surfaces.

* * * * *